Figure 1:
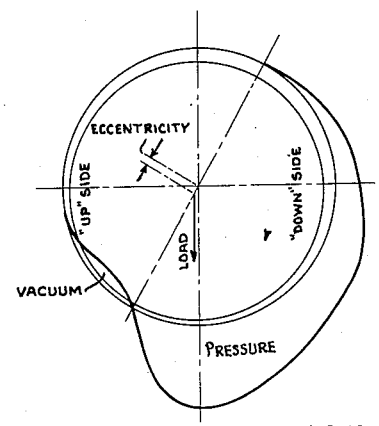

July 23, 1935.  W. B. D. PENNIMAN  2,009,323
LUBRICATING DEVICE
Filed Feb. 23, 1928   3 Sheets-Sheet 1

HYDROSTATIC PRESSURE IN A BEARING
WITH PERFECT LUBRICATION.

INVENTOR.
WILLIAM B. D. PENNIMAN.
BY
Sol Shapiro
his ATTORNEY.

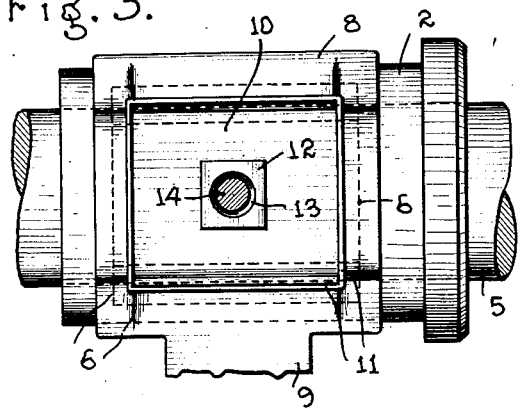
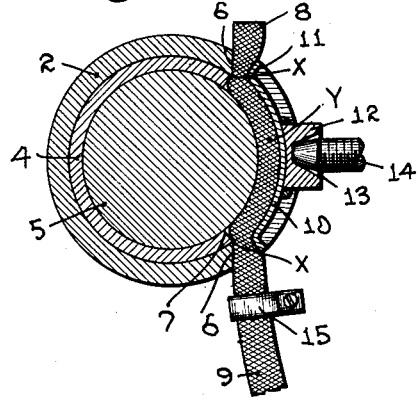
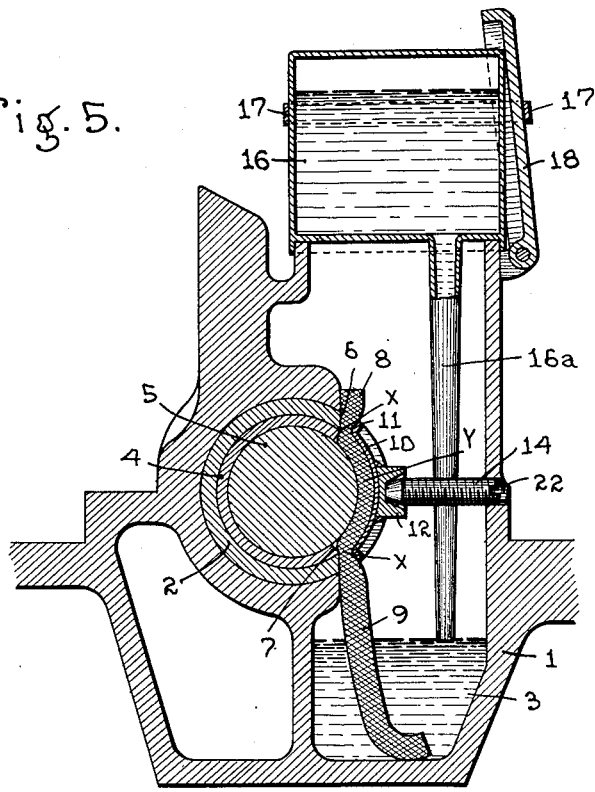

July 23, 1935.  W. B. D. PENNIMAN  2,009,323
LUBRICATING DEVICE
Filed Feb. 23, 1928  3 Sheets-Sheet 3

Inventor
WILLIAM B. D. PENNIMAN.
By Sol Shappirio
Attorney

Patented July 23, 1935

2,009,323

UNITED STATES PATENT OFFICE 2,009,323

LUBRICATING DEVICE

William B. D. Penniman, Baltimore, Md.

Application February 23, 1928, Serial No. 256,308

2 Claims. (Cl. 308—132)

This invention relates to lubricating devices, and more particularly to devices for lubricating bearings of electric motors such as electric railway motors, axle bearings such as are used in conjunction with the gears that reduce the relatively fast motion of the motor to that of the wheel axles, and analogous and related structures.

These bearings whether split or solid, are generally lubricated through a "window" or other opening in the bearing, through which window or opening the lubricant is brought to the surface of the journal and then spread from the point of application to all parts of the wearing surfaces. The window or opening through the bearing to the axle, may be in any part of the bearing, that is, at the top, at one side, or at the bottom thereof; but it is generally placed and should be so placed, with due regard to the way in which the load is carried on the bearing, being in the so-called "vacuum" space of the bearing when the machine is operated.

A bearing that is ideally lubricated has the fluid for lubrication so applied that the metallic surfaces of the journal and the bearing never come into actual contact, and the bearing and journal are said to float on each other. The friction under these circumstances is that of fluid friction only, and is dependent only upon the viscosity of the oil or other lubricant. This condition is approximately secured in those cases where a portion of the journal is completely immersed in the lubricant or dips into the lubricant, in which case the journal acts as a pump and carries an abundant supply of the lubricant to the bearing due to the adhesion properties of the lubricant. It is still more perfectly and certainly secured in those cases of which turbines are an example, where the oil is forced between the journal and the bearing by an outside pump or similar mechanical device.

The journal of an electric motor as constructed for street car use, and as ordinarily operated, does not admit of the full fluid lubrication indicated above, as the oil feed cannot be so regulated as to furnish under all conditions a sufficient supply of oil without having at times an over-supply that would flood and ruin some portions of the motor, or in any event be wasteful. In addition to this, on account of the irregularity of mechanical construction and excessive loads, a part of the journal may not be lubricated with full fluid effect, but only by the greasy or oily layer that is held to the surfaces of axle and bearing. A distinction must be made between the three kinds of friction which may be present in a journal of this type: first, we may have full fluid lubrication, in which the friction is due to the viscosity of the oil only,—the coefficient of friction in this case will vary between .001 to .01; second, we may have the friction between those layers of the oil or certain constituents of the oil which are held by adhesion to the metallic surfaces,—this is often called "greasy friction", and the coefficient of friction in this case would be from .01 to .12; and third, we may have the friction between the metallic surfaces themselves, or the so-called "dry friction", the coefficient of friction in this case being from .10 to .40. "Dry friction" only appears as the result of some serious defect of design and operation, and need not be considered, as when it occurs in large amount it results in seizing of bearings. In other words, part of the load is carried by the viscosity of the oil, and part by actual contact of the greasy layers adhering to or absorbed by the metal of the journal and the bearing. The coefficient of friction of the "oil-carried" portion for example may be taken as equal to .01 as the oil in general use is one of high viscosity. The coefficient of friction in the "greasy carried" portion—sometimes called "boundary lubrication" may be taken as in the neighborhood of .12. The "over-all" coefficient of friction under conditions given would be approximately .03. Mere inspection of the above given figures shows that the "oil carried" portion carries most of the load, while the "greasy area" creates most of the friction. The amount of the friction is evidently affected by several factors, among which the following may be noted: first the "greasy area" should be made as low as possible; second, the viscosity of the oil should be as low as possible; and third, the oil and grease layers must have a load-carrying ability sufficient to keep the two surfaces from physical contact. These several factors suggest that the problem involved should be considered from two standpoints: first, the mechanical condition of the oil-supplying apparatus; and second, the kind of lubricant that can or should be used.

In waste-packed bearings such as are generally used with railway motors, the viscosity of the lubricant is as important as its oiliness. And since the bearings run normally at a temperatuer near 80° C., a high viscosity at room temperature was ordinarily essential. While the placement of the window in the vacuum space helps to feed oil from the waste to the journal, the packing must be carefully made so that the effectiveness of the "vacuum" is not reduced. Otherwise the vacuum will be impaired and may not properly keep the oil inside of the clearance space between the journal and bearing. Further, the waste must cover the window in order to seal it. In the attached drawings, Figure 1 thereof, the conditions of service of a rotating journal are diagrammatically illustrated, and represents as indicated, ideal conditions. It is important that the vacuum should be preserved, as the rotating journal under these conditions acts as a pump and not only tends to prevent the oil from running out at the ends of the journal, but it also withdraws the necessary supply of oil from the waste in contact with it. Other properties of the lubricant, particularly its power of feeding through the waste or other capillary material used in these bearings will be considered below. The lubricant as indicated above, must be fed in sufficient amounts in order to constantly feed the space between the journal and the bearing. Its selection is dependent upon three properties: first, it must adhere to the metallic surfaces with sufficient strength; second, it should have the minimum viscosity consistent with the power of floating the journal; and third, at the temperature of the bearing, no portion of it should be volatilized and so affect the vacuum. Longitudinally, this vacuum runs to atmospheric pressures at the ends of the bearing. It is of course, not to be understood that this so-called "vacuum" is ever absolute, as in most cases the difference in pressure between the vacuum space and the atmosphere is only a few ounces; but for the reasons indicated above, it is essential for the best lubrication.

In lubricating waste packed bearings, the space in the journal box adjacent the window is generally packed with waste, the lubricant being added from time to time, and as a result, the level of the oil fluctuates from a level at about the height of the lower portion of the journal, to approximately nothing. Actual measurements of oil levels packed in this manner, such tests extending over a nine day period—for these motors are generally re-lubricated at some such time interval—show that under ordinary operating conditions, about 50% of the lubricant is consumed during the first two days of service. There is a condition of approximately equality of supply during the next four days, and a "starvation" period during the last portion of the time cycle.

The maintenance of a vacuum when the journal is packed in this way is of course uncertain, and depends in a measure upon the amount of oil that is in the waste and upon the skill of the workman. Even then, it is doubtful whether a vacuum is ever maintained as nearly as it can and should be. To limit the wastage of oil under these conditions, it is customary to use an oil of high viscosity, from 250″ Saybolt to approximately 600″, instead of the lighter oils properly and generally used in fast-running machinery and motors in stationary work. Further, the increased temperature of the bearings due to frictional effects, referred to below, require the use of a lubricant of high viscosity at normal temperatures, in order that it may possess the required viscosity at the higher temperatures to which the parts become heated during operation. Under many weather conditions, oils of this viscosity no longer flow through the waste with sufficient rapidity to supply the journal unless and until the box and contents are heated up by friction. This heat is constantly lost by radiation and by the passage of the motor through the air, and can only be maintained by additional frictional effect. Under these conditions, the lubrication is done disadvantageously, as the conditions for better lubrication are not met; the sealing of the window is not perfect; the supply of oil is irregular and at times too small; and the viscosity of the lubricant is either too high or periodically obtained at the cost of high frictional losses. Under these conditions, the difference in temperature between the outside air and the bearings often runs as high as 120° F. Such high temperatures not only mean a waste of power, but also rapid wearing of the metallic surfaces. The lubricant at high temperatures is very liable to oxidize with the formation of products deleterious to the metals, and the oil will gum very much under this oxidizing treatment. The vapor of the hydrocarbon or of the oxidation product from the hydrocarbon will tend to destroy the vacuum, so essential to the proper pumping effect on the lubricant and distribution thereof.

One of the objects of the present invention is a lubricating device for bearings which will insure substantially uniform lubrication thereof.

Another object of this invention is a lubricating device for waste packed bearings to which lubricant is supplied through a window, in which device oil or other lubricant of substantially lower viscosity than that hitherto utilizable for these purposes, may be used.

A further object of this invention is a lubricating device of the kind set forth above in which frictional losses are substantially reduced.

A still further object of this invention is a lubricating device of the kind set forth that will enable a substantial saving of power.

A still further object of this invention is a lubricating device of the character referred to, which provides for economical lubrication of bearings at temperatures but slightly higher than those of the surrounding atmosphere.

A still further object of the invention involves the regulation of the supply of lubricant supplied to such bearings as are referred to above.

A still further object of the invention involves the use of a lubricant of lower viscosity than that normally used for lubrication of railway journals and railway bearings, and more particularly electric railway journals and bearings, and the regulation of the supply of such low viscosity lubricant to the bearing etc. to be lubricated.

A still further object of the invention relates to the lubricants themselves, and involves lubricants of low viscosity but of high adhesive properties for use in bearings referred to above.

Other and further objects and advantages will appear from the more detailed description set forth below, but it will be understood that this more detailed description is given by way of illustration and not by way of limitation since various changes therein may be made by those skilled in the art without departing from the scope and spirit of this invention.

Figure 2:
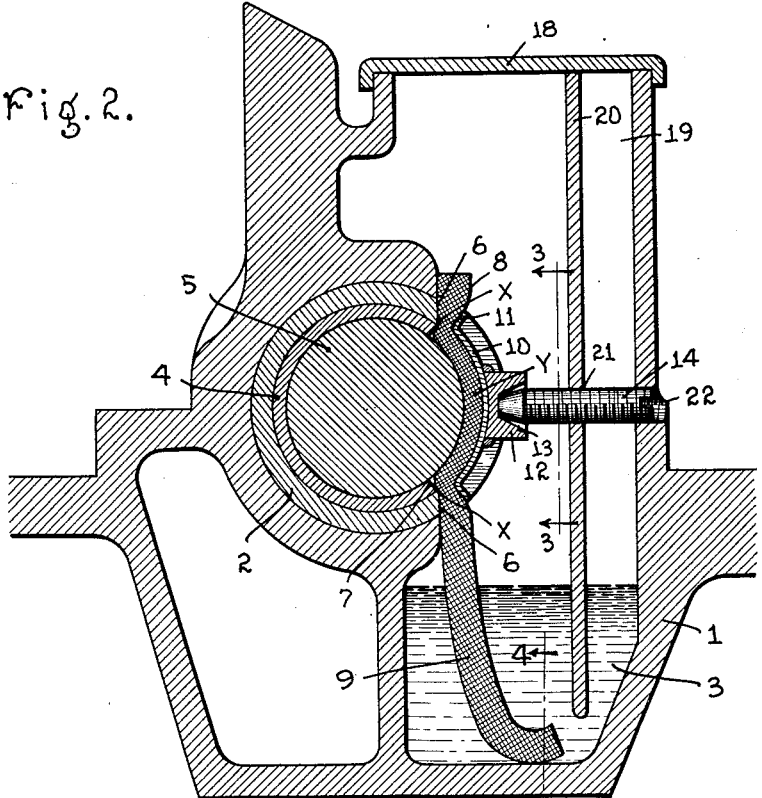
Figure 6:
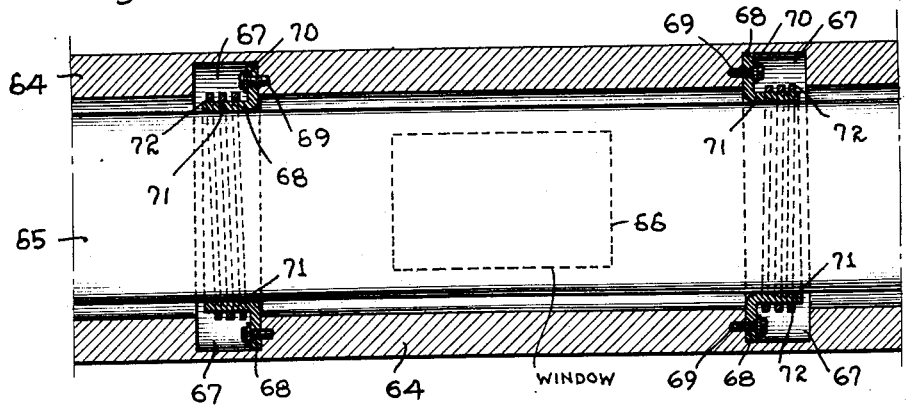
Figure 6A:
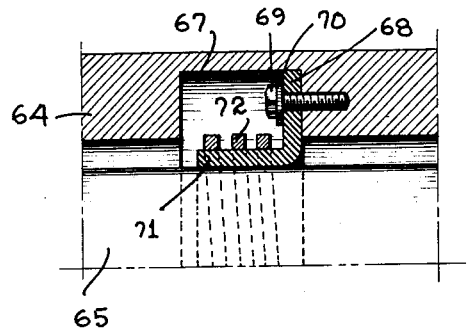
Figure 7:
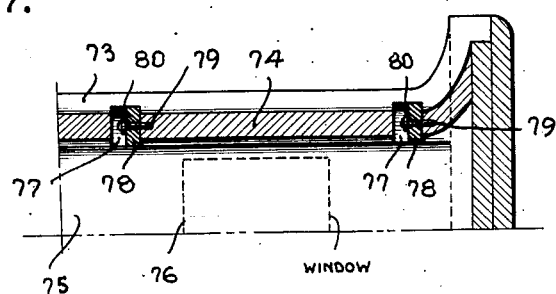

In connection with this more detailed description, the drawings illustrate a preferred form of the invention, and in them there is shown by way of illustration, in Figure 1, a diagram illustrating the conditions of service of a rotating journal under ideal condition; in Figure 2, a transverse sectional view through a journal box illustrating the novel lubricating device positioned therein; in Figure 3, a fragmentary detail sectional view taken on line 3—3 of Figure 2; in Figure 4, a fragmentary detail sectional view on a slightly smaller scale, representing a centrally transverse section through Figure 3; illustrating a modified form of compressing means for regulating the feed of lubricant through the capillary feeder; in Figure 5, a transverse sectional view through the journal box of Figure 1 with an additional constant level maintaining device for the lubricant; in Figure 6, a fragmentary detail partly in section of a bearing which may be lubricated with the device herein described, but provided with means for sealing the bearing against loss of oil; and in Figure 6a a fragmentary detail sectional view on a larger scale than Fig. 6 illustrating the seal of Fig. 6; in Figure 7 a fragmentary detail partly in section of a different type of bearing with oil seal.

The lubricating device of the present invention is adapted to secure substantially uniform and economical lubrication of bearings, and particularly those of the waste-packed type. The capacity of the rotating axle as a pump is far beyond the demands of the journal, so that the problem therefore is to regulate the supply of lubricant from an excessive maximum to a lesser and optimum and more uniform supply. To secure these results, certain properties of capillaries have been utilized.

Turning to a consideration of the factors involved in this matter, it may be noted that the feed of an oil, or indeed of any liquid through a wick is dependent upon a number of factors including, the oil lift, the density of the oil, the size of the wick, the material of which the wick is made, the size of the capillary channels, the length of the separate fibers, the surface tension of the oil, and its viscosity. The surface tension is the property which determines the up-suction produced on the oil by the wick, while the viscosity defines the frictional resistance of the oil to flow through the capillary channels or spaces of the wick. Of the factors considered above, for a given wick and oil, only a few are variable. In the first place, the viscosity of an oil or other liquid, and particularly of the oils used for lubricating purposes, varies greatly with the temperature and decreases markedly with increase of temperature. Consequently, with increase of temperature, since the surface tension remains fairly constant, yet the change in viscosity permits an increased flow of oil through the wick. The rate of flow has been found to be inversely proportional to the viscosity of the oil.

The second factor that may vary under the given conditions is the size of the capillary space, and it has been found that the rate of feed of an oil or other liquid through a capillary space varies directly as the second power of the size of the capillary. In addition it may be noted that the height to which a liquid rises in a capillary tube varies inversely as the radius of the tube. If a capillary space is very small, the height to which a liquid may be raised is thus almost indefinitely high. If a piece of felt is dipped into a vessel of oil and subjected to more or less compression transversely of the piece of felt, the capillary spaces between the fibers would evidently be decreased or increased in proportion to the pressure put upon the fibers. The amount of oil raised from the body of the oil will evidently be greater when the compression is slight, but the height of the lift would evidently be higher as the compression is greater.

In the structures illustrating the present invention, these principles are made use of by subjecting the felt or analogous material to compression at some point along its length so that the following results are secured: first, a complete and perfect sealing of the window is obtained with consequent preservation of the vacuum space; and second, there is obtained a regulation of the capillary feed of the oil to that portion of the felt which is in contact with the journal. While the lifting capacity of the compressed portion of the felt is low, the capillary spaces have been so reduced that the viscosity of the oil is relatively unimportant, and a certain pumping action is secured.

Another factor utilized in the present invention is the choice of lubricant. A regular supply of lubricant is required under the varying conditions of temperature which prevail in our climate, that is to say between 40° below zero Fahrenheit and 100° Fahrenheit. The viscosity of ordinary lubricating oils heretofore used in this art changes rapidly and increases considerably over the range of temperatures prevailing during the greater part of the year in the larger part of the United States. Lubricants are desirable therefore that show comparatively little change in viscosity over the temperature range noted.

Turning to the device illustrated in the drawings, there is shown a conventional form of journal box 1 of the type generally employed in connection with vehicles such as electric street railway cars, but it will be understood that this illustration is not to be limiting, since the device is readily applicable by those skilled in the art to other types of axles and shaft bearings.

The journal box 1 comprises the usual substantially centrally located bearing 2, and lubricant reservoir or chamber 3. The bearing 2 may be provided with a shell or bushing 4 within which is journaled the axle shaft 5. The bearing 2 is nonrotatably mounted within the journal box, while the bushing 4 is further rigidly secured within said bearing, there being a clearance of the usual few thousandths of an inch between the axle and the shell or bushing. It is this clearance space which is normally filled with lubricant or oil when the axle is turning, and the space is so small that the oil or other lubricant is retained therein by capillary attraction when the axle is at rest.

In the type of device being illustrated, the bearing 2 is cut away to provide the window 6 located at one side of this bearing. Under the usual conditions of operation of electric railway motors, the window in this position is at the so-called "vacuum" space. As pointed out above, the position of the window will be determined by the various considerations applicable hereto, so that for any given structure, the window is placed in the vacuum space, whether this be at the top, at the bottom, or to one side of the bearing. The bushing 4 is also provided with a cutaway portion so that the opening in the bearing 2 allows access to the axle 5. As indicated in the drawings, see Figure 2 for example, the walls of the bearing 2 which are cut away to form the window, may lie in a substantially vertical plane, while the portions of the bushing 4 which are cut away may be angularly disposed from that plane.

Any desired type of capillary lubricant feeder such as wool waste, cotton waste, etc., may be employed. Desirably this feeder comprises a head portion 8 somewhat larger than the window 6 so that it will completely cover the same, and a dependent stem portion 9 adapted to depend downwardly within the lubricant chamber 3, as illustrated in Figures 2 and 5 of the drawings.

Due to the location of the window on the "vacuum" space, and the position of the capillary feeder at that point, the rotating axle 5 acting as a pump, continually draws the necessary supply of lubricant from the feeder when in operation. To preserve this vacuum space, the head of the capillary feeder completely covers the window 6, and sealing or compression means 5 are provided to keep the feeder in proper contact with the shaft or axle 5 at all times.

The sealing or compression means desirably take the form of an arcuate plate 10 having the edges thereof turned outwardly, as indicated at 11, the arc of this plate conforming substantially with the surface of the axle. This plate is provided with a centrally located boss 12 carrying a conical recess 13. A pressure screw 14 is suitably mounted in the side wall of the journal box and desirably provided with a conically reduced inner extremity adapted to engage the recess 13 in the boss 12. The partition wall 20 of the journal box, may desirably be provided with a threaded opening 21 through which the screw 14 passes, and the outer wall of the journal box 1 also is desirably provided with an opening 22 through which the access to the screw 14 may be obtained. The pressure of the plate 10 against the capillary feeder 9 determines the pressure with which this feeder is forced against the axle 5. Further it will be noted that the size of the pressure plate 10 is such that the walls 11 thereof lie adjacent to the perpendicular walls of the window and in close proximity to the shoulders X—X. It will be apparent from an inspection of Figure 1 of the drawings, that the adjustment of the pressure screw will result in a greater compression of the capillary feeder against the shoulders X—X, than is exhibited at the point Y against the axle itself.

In accordance with the principles explained above which govern the action of fluids in capillary spaces, the compression of the capillary feeder 9 at the point X—X, results in a greater lifting force in the capillary feeder itself, with which the lubricant is raised from the chamber 3 to the window. There results virtually a constant pumping effect when the machine is in operation, and the feed of lubricant is substantially independent of the viscosity of the lubricant.

The same certainty of pumping action may be obtained by compressing some other portion of the capillary feeder. For example as illustrated in Figure 4 of the drawings, a compressing member 15 may be positioned upon the capillary feeder at some point below the bearing 2, any desired means being used for causing such compression member 15 to restrict or constrict the feeder 9 at this point. When this means of compressing the felt strip is utilized, the sealing of the window may be accomplished in any other desirable way. This form of the invention, may be applied in those cases where the more desired structure described above, cannot be readily applied in connection with old motors.

This constriction of capillary spaces has the effect of making the oil feeding from one portion of the felt to another, almost independent of gravity, so that those portions of the felt above the constriction tend to reach a saturation equal to those portions immediately below such constriction. In the preferred form of the apparatus in which the plate under regulated pressure is used, even if the oil level in the chamber 3 is above the lower part of the axle, the amount of oil used and fed is not materially greater than if it is a moderate distance below the window. Accordingly there is no substantial loss in efficiency of the device due to variation in the level of the lubricant supplied. Even if the entire box be filled with oil, a substantially uniform and economical lubrication will be obtained.

While the structure illustrated in Figure 2 of the drawings is the preferred form of the invention, modification thereof will be apparent, so that analogous results may be obtained with modified structures. For example in place of the screw 14 to regulate the pressure placed upon the felt, said screw may be replaced by spring means if desired.

When it is desired to keep the lubricant in the journal box at a substantially constant and predetermined level, as shown in Figure 5, the journal box may be provided with an inlet 16 or inverted container acting as a reservoir of oil supply. From this container 16, a depending feeding tube or pipe 16a feeds oil from the container to the lubricant chamber 3 in the journal box. The container 16 may be held in place in any desired manner as by flanging its lower edge so that it fits securely upon that portion of the journal box, and the cover 18 of the journal box may be turned back so that the container 16 may be strapped in position as by strap 17 passing about the container 16 and the cover 18.

In the device of Figure 6, there is illustrated a structure that may be used for the purpose of sealing the bearing against loss of oil and also against the entrance of dust and water, this structure being desirably used in conjunction with the lubricating devices described above. For this purpose, the usual bearing 64 surrounding the axle 65 and carrying the lubricating window 66, may have a recess 67 cut in the bearing, there being desirably one such recess on each side of, but some distance from the window 66. The sealing means may take the form described in my copending application for Letters Patent Serial Number 209256 filed July 29, 1927, entitled "Oil seal and dust guard for journal boxes". As set forth in that companion application, a flexible diaphragm 68 is secured to a wall of the recess 67 in any desired manner as by means of bolts 69, passing through a collar 70. The flexible diaphragm is disc like and is provided with a projecting portion 71 adapted to surround the axle 65 closely. This projecting or sleeve-like portion 71 may be further compressed against the axle 65 as by a circular spring 72. Leather offers an excellent material from which the flexible diaphragm may be made owing to its flexibility and toughness. Since the diaphragm engages closely about the axle, it effectually aids in preventing the escape of oil and also prevents ingress of water, dust or other foreign matter. To this extent it also assists in maintaining the vacuum acting at the vacuum space of the bearing.

The use of an oil seal etc. with a somewhat different type of bearing is shown in Figure 7. In this structure, the axle 75 is enclosed within the bearing 74, about which there is an enclosing shell 73. Recesses 77, 77 cut into the bearing are provided within which there may be secured a disc like seal 78 attached by means of bolts 79 to the walls of the recesses. In effect these seals act similarly to those described above in connection with Figure 6.

With regard to the lubricants used in connection with the foregoing structures, it has been found highly desirable to use improved types of lubricating oils. The choice of lubricant is best made by considering its oiliness as a property distinct from its viscosity. Obviously, the viscosity should be as low as possible consistent with flash point for the conditions under which it is used, and its adhesive properties should be as high as possible. The use of these low viscosity oils is evidently advantageous when full-fluid or viscous friction is to be utilized, as the amount of friction under these conditions is evidently dependent upon the viscosity only, and the lower that this is, the more economical it is. When the bearing comes to a stop however, or when for any reason the greasy layer has to take up the work for a short time, the lubricant must have the power of forming a greasy layer sufficiently thick to act as a cushion between the metallic surfaces and must be sufficiently adherent to remain on the surfaces of the metals under severe conditions of service. In order to secure these effects it has been found generally desirable to use a lubricant that is compounded of an oil or other liquid of the lowest practicable viscosity having dissolved or admixed with it, another substance of high adhesive properties. As indicated above, when using hydrocarbon oils as an element of the composition, the viscosity must not be so low that the product has too low a flash point, and in general it may be noted that the flash point should not be below about 225 to 230° F. As indicative of oils that may be used for this purpose, the following are given:

|  | LLV | VLV | XV |
|---|---|---|---|
| Gravity at 60° F | 24.8 | 24.8 |  |
| Flash point ° F | 290 | 280 | 235 |
| Fire point ° F | 340 | 340 | 265 |
| Viscosity at 100° F | 72 | 60 | 44 |

The oils which are characterized by the properties set forth above, have been found to be desirably used for lubrication purposes in the present invention, and that designated as XV is particularly desirable for use in connection with the present invention, due to the fact that its viscosity changes but slightly over the ordinary range of temperatures in service operations in which such oils are used.

These oils are generally compounded with an ingredient which has high adhesive or adherent properties and for such purposes lard oil has been found to be particularly useful. The oils set forth above may thus be compounded with approximately 10% No. 1 grade lard oil. Such compounded oils containing 10% lard oil have been found to be particularly useful in connection with the lubrication of railway journals, railway bearings and electric railway journals and bearings. The use of these low viscosity oils is particularly valuable in connection with the lubricating devices described above in this application, and they cannot be used economically in connection with the prior art lubricating devices, as great wastage would result, and less oil is more desirous, using these very thin oils, than when a more viscous oil with a higher flash point is used.

While the animal oil such as lard oil is particularly described above as useful for the compounded oils used in connection with electric railway bearings and journals, it is possible to utilize these special oils in connection with other motor bearings such as for gears in general, automobile engines, and even spindles. In such cases the greasy agent would not necessarily be lard oil, but in some cases palm or castor oil might be used while in other cases metallic soaps such as lead oleate and oils treated with sulphur or oxygen might be utilized, depending on the specific structure involved. In all cases however the type of lubricant used will be founded on the principle that a liquid of the lowest practicable viscosity should be used having dissolved or admixed with it another substance of high adhesive power.

The present invention has lead to phenomenal results in practice. This is well illustrated in connection with its use on street railway cars. Instead of using the substantially viscous oils heretofore utilized for lubrication purposes of this character, the viscosity of which as explained above has run from about 250 Saybolt to 600 Saybolt, in accordance with the present invention much thinner oil may now be utilized, such oils having a viscosity of 50 seconds and less at those temperatures at which the motor is ordinarily operated. Direct measurements even at ordinary temperatures, that is about 60° F., show a saving of approximately 21.4% in power, and this figure is evidently much higher when as is customary in the practice prevailing in the art prior to this invention, the bearings had to be heated up from perhaps zero degrees F. to 100° F. or higher before reaching the point where the lubricant would flow through the wick or would be taken from the wick to the bearing. Furthermore the differential between the temperature of the bearing and the temperature of the outside air when using the invention disclosed herein, is only about 20° F., which is particularly striking when compared with the temperature differential of about 100° F. or more that commonly prevailed in bearings when operated in accordance with prior art conditions. The use of these light oils for lubricating purposes and the devices which may be used in connection with them, is a noteworthy departure from the prior art practice as emphasized by the fact that oils of the characteristics hereinabove set forth could not even be obtainable on the market for lubrication purposes.

Having thus set forth my invention, I claim:—

1. In combination, a bearing, an axle journalled within said bearing, an opening in said bearing through which lubricant may be supplied to the axle, capillary lubricant feeding means within said opening in contact with the journal and extending over the edges of the opening to seal said opening against the entry of air, and means for compressing said capillary lubricant feeding mean in sealing position against the edges of said opening, the pressure on the capillary means intermediate the edges of the opening being substantially less than that at the edges, and being insufficient to produce glazing of the capillary feeding means.

2. In combination, a bearing, an axle journaled within said bearing, an opening in said bearing through which lubricant may be supplied to the axle, capillary lubricant feeding means within said opening in contact with the journal and extending over the edges of the opening to seal the opening against the entry of air, and regulatable means for compressing said capillary lubricant feeding means against the edges of the opening to seal the same and to regulate the flow of lubricant therethrough to the axle, the pressure on the capillary means intermediate the edges of the opening being substantially less than that at the edges and being insufficient to produce glazing of the capillary feeding means.

WILLIAM B. D. PENNIMAN.